United States Patent Office 3,462,462
Patented Aug. 19, 1969

3,462,462
SYNTHESIS OF VINYLIDENE EPOXIDES FROM ALLYLIC SULFONIUM SALTS
Melvin J. Hatch, Socorro, N. Mex., assignor to The Dow Chemical Company, Midland, Mich., a corporation of Delaware
No Drawing. Continuation-in-part of application Ser. No. 502,365, Oct. 22, 1965. This application Dec. 19, 1967, Ser. No. 691,711
Int. Cl. C07d *1/02, 5/22*
U.S. Cl. 260—348       7 Claims

ABSTRACT OF THE DISCLOSURE

Reaction of an allylic sulfonium salt (1) with an aldehyde free of α-hydrogen (2) in the presence of a strong aqueous base provides a novel synthesis of vinylidene epoxides (3), e.g.:

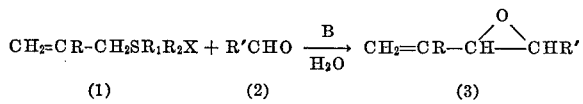

(1)        (2)        (3)

The vinylepoxides, such as butadienemonoxide, are useful polyfunctional monomers such as scavengers for hydrogen halide.

---

This is a continuation-in-part of application Ser. No. 502,365 filed on Oct. 22, 1965 by Melvin J. Hatch, Patent No. 3,426,046, issued Feb. 4, 1969.

BACKGROUND

The formation of alkyl sulfonium ylides from sulfonium salts in a strongly basic, non-aqueous solution is known. For example, dimethylsulfonaum methylide

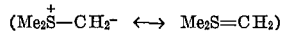

is formed by reaction of trimethylsulfonium iodide with methylsulfinylcarbanion is dimethylsulfoxide. Such sulfonium ylides can react in the non-aqueous solution with carbonyl compounds to form epoxides. [Corey & Chaykovisky, J. Am. Chem. Soc., 84, 3782 (1962); Franzen & Driessen, Tetrahedron Letters, 661 (1962), Ber., 96, 1881 (1964).] However a similar reaction in aqueous solution has not been described, even though it would have numerous advantages for industrial practice.

STATEMENT OF THE INVENTION

It has now been discovered that allylic sulfonium salts react in strongly alkaline aqueous solutions with an aldehyde free of α-hydrogen to form vinylidene epoxides. More specifically a process has been discovered for preparing vinylidene epoxides by reacting in aqueous solution: (1) an allylic sulfonium salt of the formula:

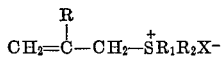

where
R is H or a $C_1$–$C_4$ alkyl group,
$R_1$ and $R_2$ are independently $C_1$–$C_4$ alkyl or hydroxyalkyl groups, and
X is a counteranion, (2) an aldehyde, R'CHO, free of α-hydrogen and (3) a water-soluble base having a pK$_a$ greater than 11.0 to form (4) a vinylidene epoxide of the formula:

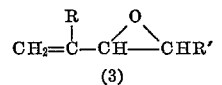

(3)

In a preferred embodiment the allylic sulfonium salt and aldehyde are reacted with base in a heterogeneous mixture of water and a water-insoluble organic extractant which removes the vinylidene epoxide from the aqueous phase as it forms.

By this process aldehydes can be converted into useful vinylidene epoxides, compounds often difficult to prepare by other methods. Not only can these epoxides be used to scavenge HCl or HBr or to stabilize a chlorinated solvent as shown by Dial U.S. Patent 3,025,331, but also as a polyfunctional monomer useful in copolymerizing with alkylene oxides as shown by Bailey U.S. Patent 3,031,439 or in the synthesis of new organosilicons described by Plueddemann U.S. Patent 3,120,546.

Reactants.—Essential is an allylic sulfonium salt of the formula:

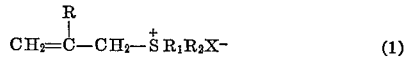

(1)

where R is H or a $C_1$–$C_4$ alkyl group, $R_1$ and $R_2$ are independently $C_1$–$C_4$ alkyl or hydroxyalkyl groups, and X is a counteranion. Such sulfonium salts can be prepared by known reactions. For example, allyl and methallyl sulfonium salts are obtained by reaction of allyl or methallyl chloride with dimethyl sulfide or bis(2-hydroxyethyl) sulfide.

Normally the allylic sulfonium salts have a halide counteranion (X). However, the halide salt can be converted into other anionic salts such as the carbonate, nitrate, sulfate, acetate, perchlorate or tosylate salt by conventional ion exchange techniques when desired.

The process is effectively limited to the condensation of allylic sulfonium salts with aldehydes free of α-hydrogen (2) because of competing reactions. Formaldehyde, furfural, benzaldehyde, p-terephthaldehyde, and other $C_6$–$C_{12}$ aromatic aldehydes are particularly suitable. The aldehyde can contain more than one reactive carbonyl group as well as alkyl, halo, hydroxyl, alkoxyl and similar substituent groups which do not interfere with the desired epoxidation.

The process also requires a strong water-soluble base. (3) The base should have a water solubility of at least 0.1 weight percent and a pK$_a$ in aqueous solution of at least 11.0. Sodium hydroxide is preferred, but other strong alkaline and alkaline earth metal bases such as potassium hydroxide, lithium hydroxide, calcium hydroxide or calcium oxide can be used.

Reaction conditions.—Water is an effective solvent for the allylic sufonium salts. Indeed the sulfonium salts are often prepared in aqueous solution and such solutions can be used in the present process without isolation of the sulfonium salt. At times addition of a moderate amount of a water-soluble $C_1$–$C_6$ alcohol, such as methanol, isopropanol, ethylene glycol, 2-ethoxyethanol, or 1,4-butanediol, is advantageous to increase the mutual solubility of the reactants.

In a preferred process, a water-insoluble organic extractant is added to remove the epoxide from the aqueous phase as it is formed, thereby minimizing hydrolysis and other reactions. To facilitate recovery of the extracted epoxide, an extractant with a boiling point between 30° C. and 130° C. is often used. Particularly suitable are aliphatic and aromatic hydrocarbons such as hexane, heptane, cyclohexane, benzene, toluene, and ethylbenzene as well as kerosene and petroleum naphtha, $C_1$–$C_4$ chlorinated hydrocarbons which are stable to aqueous alkali under reaction conditions also are effective extractants. Typical are methylene chloride, carbon tetrachloride, methylchloroform, 1,2-dichloroethane and 1,2-dichloropropane.

At times with a less reactive epoxide and carefully controlled conditions, good yields can be obtained without an extractant. Low boiling epoxides can occasionally be distilled directly out of the aqueous phase. But, in general, use of a water-insoluble extractant is preferred.

At least one mole of base is required per mole of sulfonium salt. Generally a moderate excess of base, e.g., about 1.2–5.0 moles of base per mole of sulfonium salt, is desirable. Also, for good yields of the vinylidene epoxide, a slight excess of aldehyde is preferred.

(C) Table I summarizes data from similar runs made with 1.2–4.5 N aqueous allyldimethylsulfonium chloride. In some instances the initial sulfonium chloride was prepared in methanol or isopropanol rather than water and the aqueous alcohol was used as the epoxidation medium. The yields of epoxybutene and propylene oxide given in Table I are based on gas chromatographic analysis of the recovered organic phase.

TABLE I.—SYNTHESIS OF 3,4-EPOXY-4-PHENYL-1-BUTENE

| Run | Mole Ratio | | | T.° C. | | | Percent yield [1] | |
| --- | --- | --- | --- | --- | --- | --- | --- | --- |
| | φ CHO/S+ | NaOH/S+ | Extractant | Initial | Max. | Time | Epoxy-butene | Propylene oxide |
| 1-1 | 1.0 | 1.6 | Benzene | 35 | 60 | 15 min | 37 | 21 |
| 1-2 | 1.0 | 1.6 | Toluene | 35 | 60 | 15 min | 48 | 18 |
| 1-3 | 3.0 | 1.4 | Benzene | 40 | 70 | 60 min | 57 | 13 |
| 1-4 | 1.0 | 2.5 | Toluene | 35 | 65 | 10 min | 48 | 18 |
| 1-5 | 1.0 | 1.6 | ___do___ | 5 | 15 | 1 hr | 35 | 0 |
| | | | | | | 16 hrs | 60 | 1 |
| 1-6 | 1.0 | 1.4 | Perchloroethylene | 25 | 35 | 2 hrs | 28 | 10 |
| 1-7 | 1.0 | 1.3 | None [2] | 25 | 50 | 2 hrs | 63 | 1–2 |
| 1-8 | 1.0 | 1.6 | ___do [2]___ | 35 | 70 | 2.5 hrs | 73 | 1 |

[1] By gas chromatographic analysis based on initial sulfonium salt.
[2] Run in aqueous alcohol.

Optimum conditions for a given epoxidation will depend upon the reactivity and stability of the reactants and products. For example, decreasing the rate of competing base-catalyzed reactions of the aldehyde generally favors epoxidation. Also the yield of vinylidene epoxide is greatly influenced by the reaction temperature and aldehyde concentration. The allylic sulfonium salts react readily in aqueous alkali at temperatures of about 20°–100° C. Substantially complete reaction is often achieved in 0.1–2 hours at 30°–80° C. However, a lower reaction temperature, e.g., 5°–60° C., and a high concentration of sulfonium salt and aldehyde favor the formation of the vinylidene epoxide. At higher temperatures and in dilute solution a competing hydrolytic rearrangement of the allylic sulfonium salt to an alkylene oxide occurs at a significant rate.

Within the general scope of the disclosed process, optimum reaction conditions for a given epoxidation can be determined in a routine manner. When necessary a moderate pressure can be used to maintain a liquid phase and minimize the loss of volatile materials.

To illustrate further the present invention the following examples are given. Unless otherwise specified, all parts and percentages are by weight.

Example 1—3,4-epoxy-4-phenyl-1-butene.—(A) A mixture of 282 parts (3.79 mole) of allyl chloride, 255 parts (4.11 mole) of dimethyl sulfide and 300 parts of water were stirred at room temperature for 8 days. The aqueous phase was separated and purged with nitrogen to remove residual dimethyl sulfide. By analysis it was 4.75 N in sulfonium chloride with an 89% conversion to allyldimethylsulfonium chloride and less than 1% hydrolysis.

(B) To a stirred mixture of 0.30 mole of the aqueous allyldimethylsulfonium chloride solution, 0.30 mole of benzaldehyde and about an equal volume of toluene at 30° C. was rapidly added 0.45 mole of 30% sodium hydroxide. An exothermic reaction occurred with a temperature rise to about 60° C. After about 15 minutes at 60–65° C., the organic phase was separated.

An epoxide analysis of the recovered organic phase by the pyridine·HCl method indicated a 58% yield of epoxides based on the initial sulfonium salt. Infrared and chromatographic analysis established the presence of both propylene oxide (21%) and 3,4-epoxy-4-phenyl-1-butene (37%). Fractional distillation gave a 35% yield of a liquid, 3,4-epoxy-4-phenyl-1-butene with a minimum purity of 85% by epoxy and olefinic function group analyses.

Nuclear magnetic resonance spectra of the distilled product indicated that it contained about 40% cis- and 60% trans-epoxide. Mass spectra data were consistent with this isomer distribution. Analysis of the distillation fractions boiling below 65° C. confirmed the presence of about 20% propylene oxide.

Example 2—Butadienemonoxide.—To a stirred mixture of 1.0 mole of 4.5 N aqueous allyldimethylsulfonium chloride, 3.0 mole of 30% formaldehyde and about an equal volume of toluene at 45° C. was added 1.35 mole of 50% NaOH in 3 portions. A vigorous reaction occurred with a temperature rise to 70° C. After 10 minutes reflux at 70° C., the mixture was cooled and the organic phase recovered. By analysis a 25% yield of mixed epoxides was found based on initial sulfonium salt. Distillation, chromatographic and infrared analyses indicated an 8% yield of 3,4-epoxy-1-butene (butadienemonoxide) and a 12% yield of propylene oxide.

Example 3—4-furfuryl-3,4-epoxy-1-butene.—A mixture of 0.30 mole of allyldimethylsulfonium chloride and 0.30 mole of 2-furfural in water and benzene was stirred and heated to about 35° C. Then 0.47 mole of 50% NaOH was added. After 15 minutes at reflux, the mixture was quenched and the light brown organic phase was separated. After stripping dimethyl sulfide and benzene, the liquid residue was distilled in vacuo. A 69% yield of liquid 4-furfuryl-3,4-epoxy-1-butene, B.P. 51–53° C./3 mm. was obtained. The epoxide had a minimum purity of 92% by epoxide analysis.

Example 4—4 phenyl-3,4-epoxy-2-methyl-1-butene.—A mixture of 0.15 mole of 4.3 N aqueous methallyldimethylsulfonium chloride, 0.15 mole of benzaldehyde, 0.24 mole of 50% NaOH and about an equal volume of benzene was heated at reflux (63–65° C.) for 1.5 hrs. The organic phase was separated, neutralized, and then the volatile material was stripped by distillation. The overhead distillate contained a 1–2% yield of isobutylene oxide while the residue contained a 57% yield of 4-phenyl-3,4-epoxy-2-methyl-1-butene.

I claim:

1. A process for preparing vinylidene epoxides which comprises: reacting in aqueous solution
   (1) an allylic sulfonium salt of the formula:

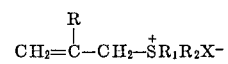

where

R is H or a $C_1$–$C_4$ alkyl group,
$R_1$ and $R_2$ are independently $C_1$–$C_4$ alkyl or hydroxyalkyl groups, and
X is a counteranion, (2) An aldehyde, R'CHO, selected from the group consisting of formaldehyde, 2-furfural, and a $C_6$–$C_{12}$ aromatic aldehyde, and (3) a water-soluble base having a $pK_a$ greater than 11.0 to form (4) a vinylidene epoxide of the formula:

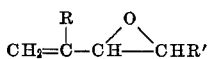

2. The process of claim 1 where the base is sodium hydroxide.

3. The process of claim 1 where a water-insoluble organic extractant is added to the reaction mixture to remove the epoxide from the aqueous phase as it is formed.

4. The process of claim 3 wherein the extractant is a hydrocarbon or a $C_1$–$C_4$ chlorinated hydrocarbon said extractant having a boiling point between about 30°–130° C.

5. The process of claim 4 wherein the sulfonium salt is allyldimethylsulfonium chloride.

6. The process of claim 4 where the vinylidene epoxide is 3,4-epoxy-1-phenyl-1-butene.

7. The process of claim 4 where the vinylidene epoxide is butadienemonoxide.

References Cited

Corey et al., Jour. Amer. Chem. Soc., vol. 84 (1962), p. 3782.

Franzen et al., Tetrahedron Letters (1962), p. 661.

Franzen et al., Ber. Deut. Chem. Ges. (1964), p. 1881.

NORMA S. MILESTONE, Primary Examiner

U.S. Cl. X.R.

260—88.3, 347.2, 607, 609